(12) United States Patent
Jens

(10) Patent No.: US 8,376,002 B2
(45) Date of Patent: Feb. 19, 2013

(54) APPARATUS FOR FILLING TUBE-SHAPED OR BAG-SHAPED PACKAGING

(75) Inventor: Thomas Jens, Groβ Hansdorf (DE)

(73) Assignee: Tipper Tie Technopack GmbH, Glinde (DE)

( * ) Notice: Subject to any disclaimer, the term of this patent is extended or adjusted under 35 U.S.C. 154(b) by 0 days.

(21) Appl. No.: 13/124,320

(22) PCT Filed: Sep. 28, 2010

(86) PCT No.: PCT/EP2010/005908
§ 371 (c)(1),
(2), (4) Date: Apr. 14, 2011

(87) PCT Pub. No.: WO2011/038885
PCT Pub. Date: Apr. 7, 2011

(65) Prior Publication Data
US 2012/0175015 A1    Jul. 12, 2012

(30) Foreign Application Priority Data
Sep. 29, 2009    (DE) .................... 20 2009 013 062 U

(51) Int. Cl.
*B67C 3/26*    (2006.01)
(52) U.S. Cl. .................. 141/284; 141/114; 141/314
(58) Field of Classification Search .................. 141/114, 141/252, 269, 284, 314, 368; 53/576, 550, 53/567; 206/802; 452/21, 22, 38
See application file for complete search history.

(56) References Cited

U.S. PATENT DOCUMENTS 6,651,705 B1 * 11/2003 Topfer .......................... 141/155
6,875,100 B2 * 4/2005 Topfer ............................ 452/40

FOREIGN PATENT DOCUMENTS

| CH | 682440 | 9/1993 |
|---|---|---|
| DE | 2910476 | 9/1980 |
| DE | 4009803 | 10/1991 |
| DE | 19953695 | 1/2001 |
| DE | 10251596 | 4/2004 |
| EP | 0456184 | 11/1991 |
| EP | 1588621 | 10/2005 |

OTHER PUBLICATIONS

English Translation of the International Preliminary Report on Patentability for corresponding PCT application No. PCT/EP2010/005908, Date of Mailing Apr. 12, 2012.
International Search Report for PCT application No. PCT/EP2010/005908, Date of mailing Apr. 2, 2011.
German Search Report for German (DE) priority application No. 20 2009 013 062.2, Aug. 27, 2010.

* cited by examiner

*Primary Examiner* — Gregory Huson
*Assistant Examiner* — Jason K Niesz
(74) *Attorney, Agent, or Firm* — Myers Bigel Sibley & Sajovec, P.A.

(57) ABSTRACT

In the case of an apparatus for filling tubular or bag-shaped packagings with a paste-like product, said apparatus including a fill pipe (1) and a holder for a casing brake that is arranged at the fill pipe (1), the pull-off movement is effected by means of a pivoting and pulling movement when the fill pipe (5) is pivoted away. This means that the casing brake is able to assume three sturdy positions in relation to the fill pipe (5) whilst not taking up much space and is able to be removed from the pipe (5) in a simple manner for changing a packaging tube.

9 Claims, 1 Drawing Sheet

(1)

APPARATUS FOR FILLING TUBE-SHAPED OR BAG-SHAPED PACKAGING

RELATED APPLICATIONS

This application is a §371 national stage application of PCT/EP2010/005908, filed Sep. 28, 2010, which claims priority to German Application Serial No. 20 2009 013 062.2, filed Sep. 29, 2009, the contents of which are hereby incorporated by reference as if recited in full herein.

The invention relates to an apparatus according to the preamble of claim 1. Apparatuses of this type are used, in particular, in the production of sausages in order to fill the sausage meat into the sausage casing.

Known apparatuses of this type include a fill pipe, the packaging tube, closed at one end, being put over one end of said fill pipe and gathered. From the other end of the fill pipe filling product is pushed through the fill pipe such that said filling product emerges out of the fill pipe mouth and through the pressure of the following product little by little pulls off the packaging tube. A closing device is normally located on the other side of the fill pipe mouth, said closing device constricting the filled packaging tube in a portioning manner by way of constricting elements and subsequently sealing it by way of sealing tools, e.g. by means of metal closing clips. Packaging portions that are closed at both ends, in particular sausages, can be produced in this way.

So that the pulling-off of the packaging tube is effected in a uniform manner and a certain fill pressure is set therein, a casing brake is located at the level of the fill pipe mouth. Said casing brake rests from the outside on the packaging tube and presses it onto the fill pipe such that a frictional force is generated that has to be overcome for the pulling-off process. A rubber ring that rests on the pipe right around said pipe is particularly suitable as the casing brake.

The casing brake is held in position by a casing brake holder. In order to be able to charge the fill pipe with new packaging material once a fill operation has been terminated, the casing brake has to be moveable along the fill pipe at the level of the fill pipe mouth into a release position. Arranging the casing brake so as to be displaceable parallel to the fill pipe axis for this purpose is known. The pipe is additionally pivotably mounted about a pipe pivot axis that is removed from the fill pipe mouth such that it can be pivoted towards the user once the casing brake has been pulled away, so that said user is able to pull new packaging material onto the pipe in a simple manner.

In the prior art, the casing brake is pulled away from the fill pipe when said fill pipe is situated in the operating position. In this position, however, a closing device is located directly in front of the fill pipe mouth. In order to create space for the movement of the casing brake, the closing device, for its part, has to be partially or completely moved away from the fill pipe. Solutions to this are known where the entire closing device is pulled away on rails or can be pivoted away in its entirety about an axis. Somewhat more attractive, but still very expensive and time-consuming, is moving away individual parts of the closing device, for instance only the constricting elements.

There is also the fact that the casing brake is often to assume three sturdy positions in relation to the fill pipe. Along with the operating position, that is to say during the usual pulling-off of the packaging tube during the filling process, and the release position, it should also be possible to hold the casing brake robustly in a so-called pull-through position. Said pull-through position is a third position along the fill pipe axis in which the frictional force exerted on the packaging material is reduced to make it easier to be able to pull the material through the annular gap between casing brake and fill pipe. A temporary reduction in the frictional force is desired in many applications, for instance in order to reduce the risk of the packaging material bursting at the beginning of the fill operation for a packaging portion. The frictional force is normally reduced in the pull-through position in that the outer circumference of the fill pipe in this position is slightly smaller than in the operating position. This effect can also be achieved by means of the pneumatic casing brake. In this case, the brake ring is tensioned or the tension is relieved by means of pneumatic activation. The possibility of three axial positions of the casing brake in relation to the pipe is, however, structurally expensive and time-consuming especially whenever a drive is to be provided for the change between said positions. Pneumatic drives are preferable for this purpose, however even with such a drive it is difficult to obtain three sturdy positions.

It is the object of the invention to solve the problem of space and the problem of the three sturdy positions of the casing brake and at the same time to enable simple handling by the operator. This object is achieved by the features of the characterizing part of claim 1. The subclaims include further improvements of the invention.

In this case, the operating position of the fill pipe is the position that it assumes when filling product is pushed through the fill pipe such that packaging material that has been pulled on the fill pipe is pulled off. The fill pipe axis is that axis of the fill pipe when it is situated in its operating position.

The pipe pivot axis normally stands at right angles such that the fill pipe can be pivoted away to the side of the apparatus. In addition, the pipe pivot axis normally intersects the fill pipe axis at a right angle. The pull-on position can be any position of the fill pipe that has been pivoted away out of the operating position. Normally, it is at such a spacing away from the operating position that new packaging material can be pulled over the fill pipe mouth in a convenient manner. In practice, in the majority of cases this requires a pivotal movement of at least 20°.

Any object that is suitable, when resting on the packaging material located on the fill pipe, to exert a frictional force onto said packaging material, is suitable as a casing brake. Arranging the casing brake at the level of the fill pipe mouth means that it is located in the vicinity of the mouth. It normally rests on the fill pipe a few millimeters away from the mouth.

The term "casing brake holder" refers to any device that holds the casing brake in position and enables movement of the casing brake along the fill pipe at the level of the fill pipe mouth. The casing brake holder can also include a housing for the casing brake.

The casing brake holder according to the invention enables not only a linear movement of the casing brake along the fill pipe axis, but a pull-off movement of the casing brake in such a manner that the casing brake is pivoted away from the fill pipe axis and is pulled away from the pipe pivot axis. In this case, the pivoting away and the pulling away can be effected at the same time. However, this is not compulsory. Said movement portions can also run one after another or can be completely or partially superposed. In particular, the pull-off movement can consist initially in a pure pivoting-away movement and the pulling-away movement can only be effected in a subsequent movement phase. The decisive factor is that the casing brake leaves the fill pipe axis. The fact that the casing brake holder enables the movement of the casing brake means that the holder assumes its holding function in each portion of the movement. If, for instance, the casing brake is moved by hand and then released, the casing brake holder holds it in position.

In addition, the casing brake holder includes a guide device for the casing brake, said guide device being designed such that, at least in one movement portion of the pull-off movement of the casing brake, pivoting the pipe at the same time brings about movement of the casing brake. This means that the operator, by pivoting the fill pipe, is able at the same time to set the pull-off movement of the casing brake in motion, which means that separate operating steps or manipulations for this movement are superfluous.

In the case of the apparatus according to the invention, fill pipe and casing brake can be associated with the same machine, that is to say, in particular, can be components of a filling or closing machine. However, it is equally possible for them to be associated with different machines, that is to say, for instance, the casing brake along with casing brake support with a closing machine and the fill pipe with a filling machine.

In an advantageous manner, the casing brake holder includes a guide device for the casing brake, said guide device holding the movement of the casing brake in one plane. This improves the operating convenience and the operating reliability as the movement of the casing brake can be better anticipated by the operator.

In a corresponding manner, operating convenience and operating reliability are further increased in an advantageous manner when the casing brake holder includes a guide device for the casing brake, said guide device allowing the pull-off movement only along one path of movement at least in one movement portion.

The term "path of movement", in this sense, means that the movement only has one degree of freedom. It is then especially easy to control.

In an advantageous manner, in the case of one of the above-mentioned further developments, the guide device includes a control cam. This enables a controlled pull-off movement in a simple and reliable manner. In this case, it is additionally advantageous when the control cam includes an arcuate portion. It is then easy for the operator to anticipate the movement of the casing brake. In addition, it is advantageous when the arcuate portion is located such that the centre of the circle coincides with the pipe pivot axis. In this case, the pull-off movement of the casing brake can be brought about in a manner that does not use much force by pivoting the pipe. As an alternative to this arrangement of the centre of the circle, said centre of the circle can advantageously be located closer to the fill mouth than the pipe pivot axis. In this case, it is also possible to pivot longer pipes together with the casing brake. The guide device according to the invention does not, therefore, forcibly determine the length of the fill pipe. Instead of an arcuate portion or in addition for a later phase of the pull-off movement, the control cam includes a portion in which the section of the casing brake to be covered for the pivotal movement is longer than that for the pull-off movement. This brings about a force transformation in such a manner that the force to be expended is smaller than in the case of a traditional, purely linear pull-off movement. Consequently, the operating steps of the pulling-off of the casing brake and of the pivoting-out of the pipe are combined to form not only one single step. A smaller force consumption is also necessary for the pulling-off of the casing brake.

In the case of a guide device with an arcuate portion, it is additionally advantageous when a portion with larger movement radii connects to the arcuate portion when the pull-off movement is carried out. In this case, the guide device also brings about a pulling-away of the casing brake from the fill pipe. This is especially effective and consequently advantageous when the larger movement radii are in such a manner that the pull-off movement runs through an arc shape with opposing curvature to the preceding arcuate portion.

An exemplary embodiment of the invention is explained below by way of drawings, in which, in detail:

Figure 1:
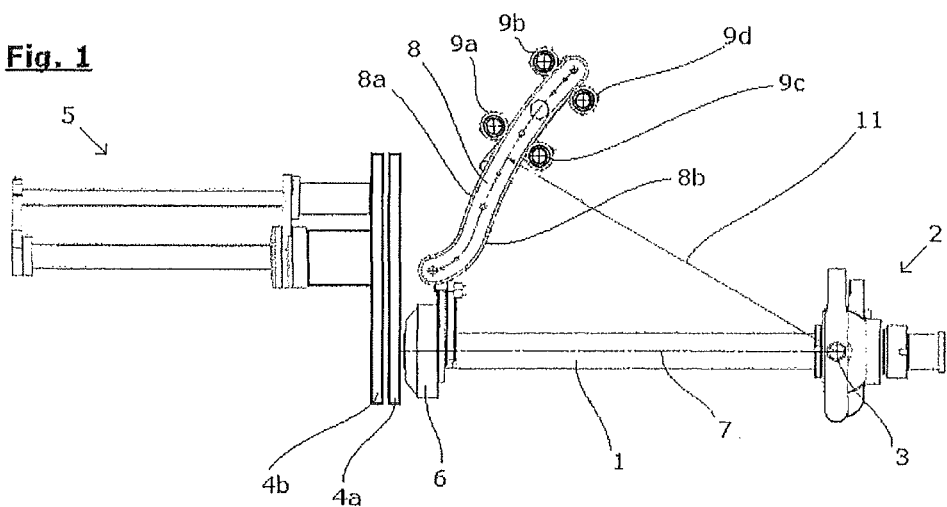
FIG. 1 shows a top view of an apparatus according to the invention with fill pipe and casing brake in the operating position.

A fill pipe 1 is mounted on a fill pipe support, given the overall reference 2, so as to be pivotable about a pipe pivot axis 3 that is at right angles to the drawing plane. In the position shown in FIG. 1, the fill pipe 1 is situated in its operating position. In said position, the constricting elements of a closing device, combined to form two groups 4a, 4b that are axially spaced apart from one another, are situated at the end face directly in front of the fill pipe mouth 1a. The group 4a of constricting elements remote from the fill pipe mouth 1a is moveable by means of a guide rod, given the overall reference 5, axially away from the fill pipe mouth 1a. This means that, after the filling of a packaging portion and the subsequent constriction, a packaging portion free of filling product can be formed, onto which closing clips can be placed in a simple manner. It is therefore not necessary for the group 4a of constricting elements facing the fill pipe mouth 1a to be able to move. In the case of known apparatuses, axial mobility of this group 4a also is nonetheless provided as otherwise the casing brake that is held in a casing brake housing 6 cannot be pulled away from the fill pipe 1. This pulling-away is effected in the prior art in a linear manner along the fill pipe axis 7, whilst the fill pipe is still in the operating position shown in FIG. 1. Only once this has been effected is the fill pipe 1 pivoted away to the side about the pipe pivot axis 3, such that new packaging material is able to be pulled-on.

According to the exemplary embodiment according to the invention, in contrast to this, the casing brake housing 6 together with the casing brake does not execute a linear movement, but is pivoted away from the fill pipe axis 7 in a first movement portion together with the fill pipe 6 and in a movement portion subsequent thereto is additionally pulled-away from the fill pipe axis 3. This is achieved by means of a control cam that is formed, in the exemplary embodiment, by a rail 8 and a control truck 9 that runs along on the flanks 8a, 8b of said rail by means of wheels 9a, 9b, 9c and 9d. A housing support, given the overall reference 10, for the casing brake housing 6 is situated at the end of the control truck 9 facing the fill pipe 1. The arrangement of control truck 9, housing support 10 and casing brake housing is rigid. The axes for the wheels 9a, 9b, 9c and 9d are, however, supported on the control truck 9 so as to be pivotable in the drawing plane.

The flanks 8a, 8b of the rail 8 are formed such that when the casing brake performs the pulling-off movement, the control truck 9 initially runs through an arcuate portion. The centre of the circle of said movement portion coincides with the pipe pivot axis 3, the movement radius is denoted by the reference 11. The result of this is that when the fill pipe 1 is pivoted by the operator, the casing brake is also forcibly entrained, consequently therefore the pull-off movement is introduced. Neither a separate operating step nor manipulation is necessary for the pull-off movement. The centre of the circle for the movement of the control truck 9 does not have to coincide absolutely with the pipe pivot axis 3 for this purpose. It can also lie, when viewed from the fill pipe mouth 1a, in front of the pipe pivot axis 3, preferably on the fill pipe axis 7. The fill pipe should then certainly be long enough such that it is able to entrain the casing brake during said arcuate movement portion of the pull-off movement. This is shown by way of the longer fill pipe 1' as an alternative design variant in FIG. 2, where the fill pipe support is given the reference 2' and the pipe pivot axis the reference 3'.

Figure 2:
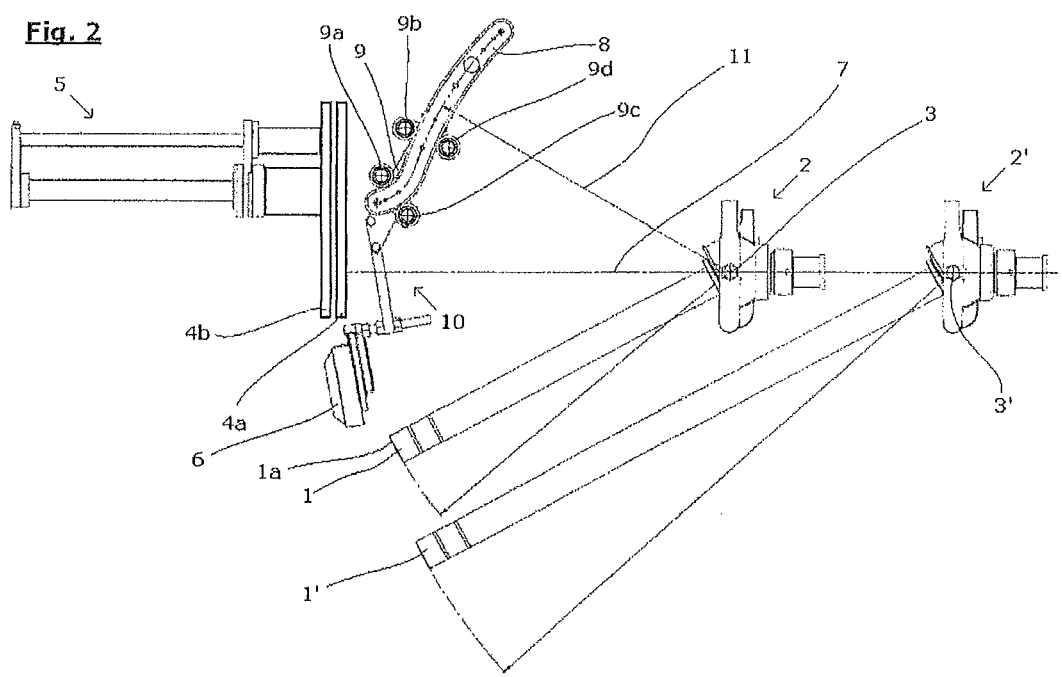
FIG. 2 shows the apparatus in FIG. 1 in the same view with fill pipe and casing brake in the pull-on position and an alternative design variant for the fill pipe.

The further development of the flanks 8a, 8b is then in such a manner that the movement radius 11 of the control truck 9 is increased, in the exemplary embodiment so strongly that the development of curvature of the flanks 8a, 8b follows the opposite direction. In this way, as the fill pipe 1 continues to pivot, the casing brake is either pulled-away from said fill pipe automatically or can be pulled away by using a small amount of force such that the fill pipe mouth 1a comes free. This modification of the development of the flanks 8a, 8b is arranged such that the movement of the casing brake housing 6 away from the fill pipe 1 is effected at a point at which the casing brake housing 6 can no longer collide with the constricting elements 4a, 4b of the closing device, as shown in FIG. 2.

The invention claimed is:

1. Apparatus for filling tubular or bag-shaped packaging with a paste-like product, said apparatus having a fill pipe, which is pivotable about a pipe pivot axis between an operating position and a pull-on position and has a fill pipe axis and a fill pipe mouth, a casing brake located at the level of the fill pipe mouth, a casing brake holder that enables movement of the casing brake along the fill pipe at the level of the fill pipe mouth, characterized in that the casing brake holder enables a pull-off movement of the casing brake in such a manner that the casing brake is pivoted away from the fill pipe axis and is pulled away from the pipe pivot axis and the casing brake holder includes a guide device for the casing brake, said guide device being designed such that, at least in one movement portion of the pull-off movement of the casing brake, pivoting the pipe at the same time brings about movement of the casing brake.

2. Apparatus according to claim 1, characterized in that the guide device holds the pull-off movement of the casing brake in one plane.

3. Apparatus according to claim 1, characterized in that the guide device allows the pull-off movement only along one path of movement at least in one movement portion.

4. Apparatus according to claim 1, characterized in the guide device includes a control cam.

5. Apparatus according to claim 4, characterized in that the control cam includes an arcuate portion.

6. Apparatus according to claim 5, characterized in that the arcuate portion is located such that the centre of the circle coincides with the pipe pivot axis.

7. Apparatus according to claim 5, characterized in that the centre of the circle of the arcuate portion is located closer to the fill pipe mouth than the pipe pivot axis.

8. Apparatus according to claim 5, characterized in that a portion with larger movement radii connects to the arcuate portion when the pull-off movement is carried out.

9. Apparatus according to claim 8, characterized in that the larger movement radii are in such a manner that the pull-off movement runs through an arc shape with opposing curvature to the preceding arcuate portion.

* * * * *